United States Patent [19]

Schwechel

[11] Patent Number: 5,679,003

[45] Date of Patent: Oct. 21, 1997

[54] HAZARDOUS MATERIAL LEAK TRAINING SIMULATOR

[75] Inventor: Donald J. Schwechel, Big Bend, Wis.

[73] Assignee: Miller Brewing Company, Milwaukee, Wis.

[21] Appl. No.: 649,045

[22] Filed: May 16, 1996

[51] Int. Cl.$^6$ .................................................. G09B 19/00
[52] U.S. Cl. .................................................. 434/219; 434/226
[58] Field of Search ................................. 434/219, 226, 434/218

[56] References Cited

U.S. PATENT DOCUMENTS

| | | |
|---|---|---|
| 4,001,949 | 1/1977 | Francis . |
| 4,303,396 | 12/1981 | Swiatosz ................. 434/226 |
| 4,526,548 | 7/1985 | Livingston ............... 434/226 |
| 5,275,571 | 1/1994 | Musto et al. ............. 434/226 |
| 5,562,455 | 10/1996 | Kirby et al. ............. 434/226 |

FOREIGN PATENT DOCUMENTS

| | | |
|---|---|---|
| 0649633 | 4/1992 | Australia ................. 434/218 |
| 1405087 | 6/1988 | U.S.S.R. ................. 434/218 |

Primary Examiner—Jeffrey A. Smith
Attorney, Agent, or Firm—Quarles & Brady

[57] ABSTRACT

A simulator for training emergency response personnel in handling hazardous materials leaks includes a housing with a door. A cylinder, of a type used to contain a hazardous material, is within the housing and has a leak hole intentionally made therein. The cylinder includes a standard outlet valve, a regulator and a hose connected to the housing. In addition, the cylinder has been modified with a first fitting through which air can be introduced and a second fitting through which water can be introduced. Conduits are provided to supply air and water to the first and second fittings, respectively, in order to force air and/or water into the cylinder and exit through the hole to simulate a hazardous materials leak. A fog generator produces fog within the housing to simulate a gas haze of a material leak. Electrical devices normally found in housing for these cylinders also can be provided.

22 Claims, 1 Drawing Sheet

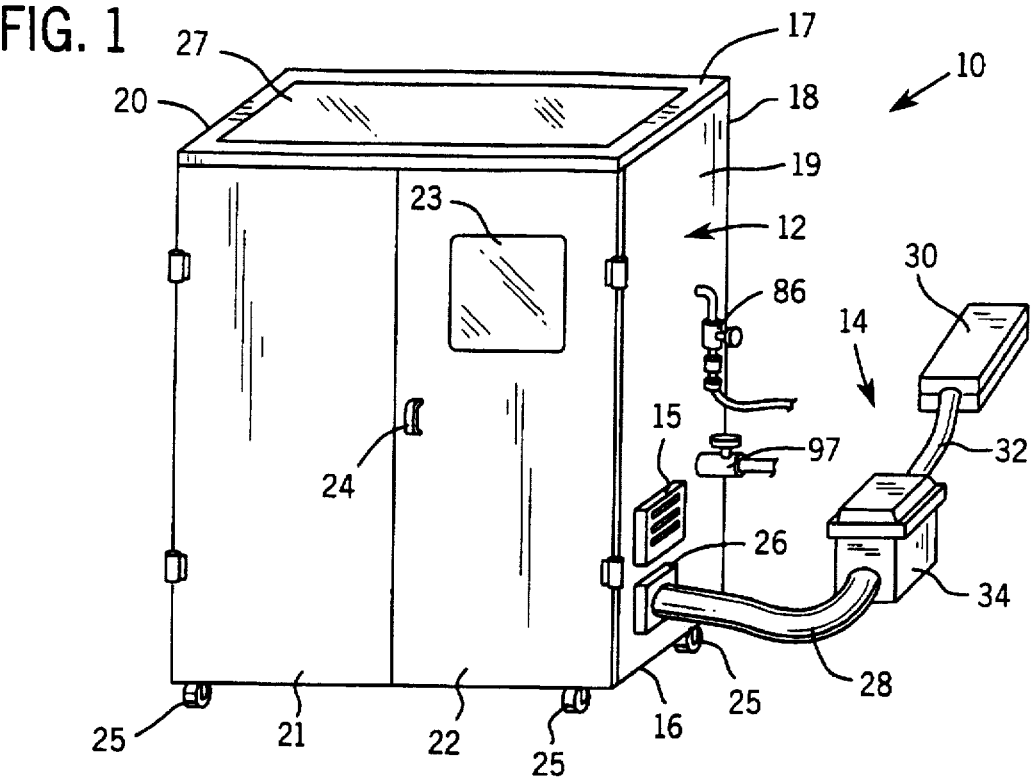
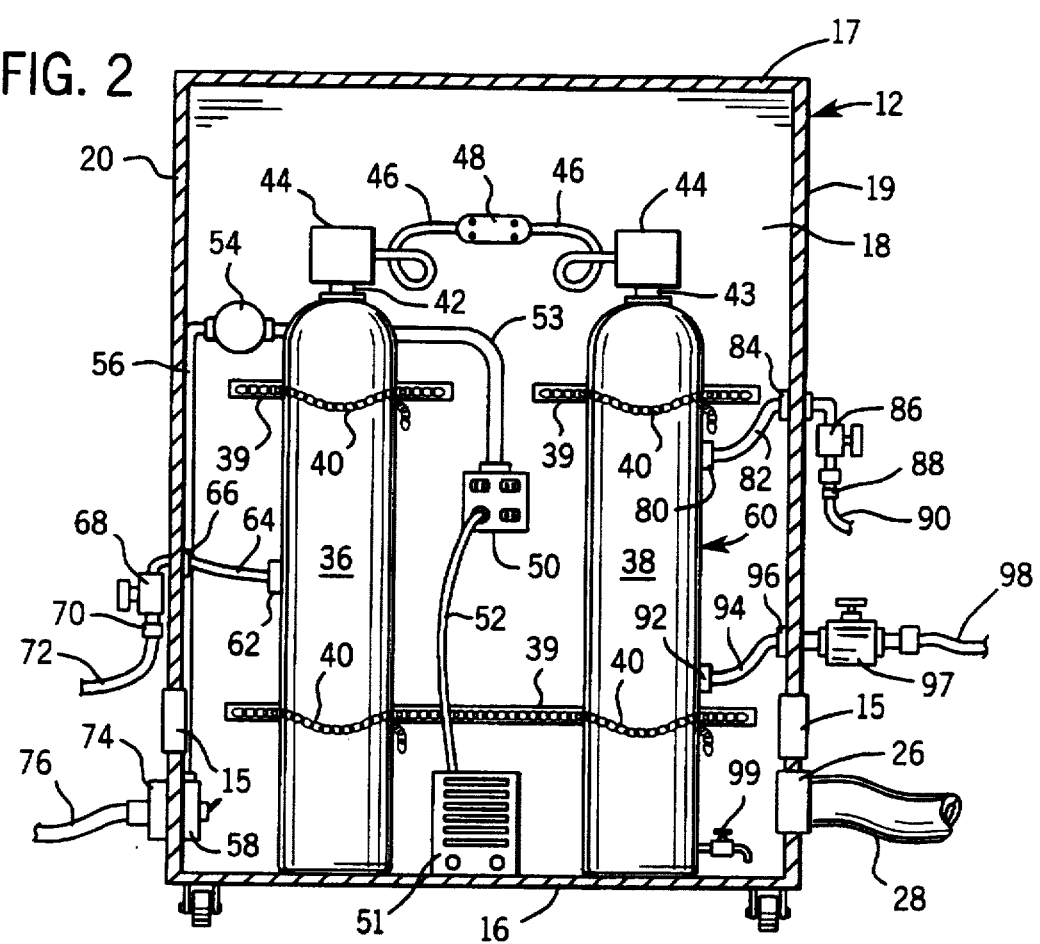

HAZARDOUS MATERIAL LEAK TRAINING SIMULATOR

BACKGROUND OF THE INVENTION

The present invention relates to apparatus for simulating a hazardous material leak for the purpose of training emergency response personnel.

Chemicals, such as ammonia and chlorine, often are stored in 150 pound gas cylinders that are connected by hoses to industrial equipment that use the chemicals. Because of the hazardous nature of such chemicals the cylinders typically are enclosed in a shed which is locked to prevent unauthorized individuals from tampering with the cylinders. Nevertheless, leaks from the cylinders and related plumbing may occur. Because of the hazardous and toxic nature of such chemicals, any leak must be immediately and effectively dealt with by emergency response personnel. Such personnel must be trained to contain the escaping chemicals and stop further leakage.

The emergency response personnel receive extensive training in how to deal with a variety of leaks which can occur within the chemical storage sheds. It is desirable that these personnel be trained under conditions which accurately represent a hazardous material leak. However, because many of these chemicals are highly toxic, it is impractical to produce an actual chemical leak merely for training purposes, especially when novice trainees will handle the situation. As a consequence, it is desirable to provide a non-toxic simulation which replicates actual leak conditions for training purposes.

SUMMARY OF THE INVENTION

A general object of the present invention is to provide an apparatus for simulating hazardous material leaks for training emergency response personnel.

Another object is to provide such an apparatus which creates a non-toxic, non-hazardous simulation of such hazardous material leaks.

A further object of the present invention is to provide such a hazardous material leak simulator which is able to replicate different types of leaks for training exercises.

These and other objects are satisfied by a hazardous material leak simulator which includes a housing having a door. A container, of a type which commonly is used to contain a hazardous material, is located inside the housing and has an outlet connected by a first conduit to the housing. A hole is intentionally made in the container to provide a leak where the container contents escape. The container has a fitting through which a fluid, such as compressed air or water, can be introduced into the container. A second conduit is connected to the fitting to supply the fluid thereto. In the preferred embodiment, a pair of fittings and conduits are provided so that both air and water can be fed into the container in order to simulate either a gas or a liquid leak.

Another aspect of the present invention is to be able to simulate a haze produced when certain chemicals leak into the atmosphere. To accomplish that simulation, a fog generator is attached to inject fog through an opening in the housing. A conventional fog machine as used in theatrical productions is connected to an opening in a closed chest that contains a frozen substance, such as dry ice. An outlet opening of the chest is coupled to the opening in the housing. The frozen substance cools the fog so that the fog will drop to the bottom of the housing in the same manner as haze from many chemical leaks.

In the preferred embodiment of the simulator, the housing is provided with an electrical circuit, having a power shut-off switch, a light, receptacles and a heater.

BRIEF DESCRIPTION OF THE DRAWINGS

FIG. 1 is an isometric view of a hazardous material leak simulator; and

FIG. 2 is a front view of the shed for the hazardous material leak simulator with the doors removed.

DETAILED DESCRIPTION OF THE INVENTION

With initial reference to FIG. 1, a hazardous material leak simulator 10 includes a storage shed and a fog generating apparatus 14. The shed 12 is of a standard type used to house cylinders of hazardous gas at a factory and is essentially a metal box having a floor 16, roof 17, back wall 18 and two sidewalls 19 and 20. The front of the shed 12 is closed by two doors 21 and 22 with the latter door having a window 23. The doors can be locked in the closed position using a handle 24.

This standard shed has been modified for training purposes. Four locking-type swivel wheels 25 are mounted on the underside of the floor 16 allowing the shed 12 to be moved into an appropriate location for a training exercise. Each side wall 19 and 20 has an air vent 15. The roof 17 of the shed 12 has a window 27 of high impact resistant plastic. The window 27 enables a video camera to be mounted above the shed 12 to record the training exercise for evaluation of the trainee's attempt to rectify the hazardous material leak. A mounting bracket (not shown) may extend upward from the shed roof 17 for mounting the video camera.

The right sidewall 19 of the shed has been modified with an opening that has a coupling ring 26. The coupling ring 26 receives one end of a round, flexible first duct 28. The other end of the first duct 28 is attached to the outlet of the fog generator 14 which includes a standard oil vaporization type fog machine 30, such as a model 1600 manufactured by Rosco of Port Chester, N.Y., U.S.A. Because the fog produced by machine 30 is relatively warm rising upward when released into the atmosphere, the outlet of the fog machine 30 is connected by a second round flexible duct 32 to a hole in the wall of a standard ice chest 34 which contains dry ice. An outlet opening in the ice chest 34 is connected to the other end of the first duct 28. As the fog produced by machine 30 flows through the ice chest 34, it is cooled so that when entering the shed 12 the fog will accumulate in the bottom of the shed in the same manner as haze from escaping chlorine gas.

Referring to FIG. 2, the inside of the shed 12 contains a pair of 150 pound gas cylinders 36 and 38 secured to mounting brackets 39 by chains 40. For training purposes, the cylinders 36 and 38 are empty and do not contain the hazardous materials for which leaks will be simulated. Outlet valves 42 and 43 at the top of cylinders 36 and 38 is coupled by conventional automatic gas flow regulators 44 and hoses 46 to an output fitting 48 for the shed 12. Because the present apparatus is a simulator the gas flow regulators 44 and hoses 46 may be simulated with components that represent those devices.

Also within the shed 12 is a pair of duplex electrical outlets 50 connected by wiring conduit 53 to an enclosed light 54 which in turn is connected by another conduit 56 to an electrical switch 58 which shuts off all electrical power inside the shed. For the simulator 10, an external electrical connector 74 is provided to connect switch 58 to an source electricity via an extension cord 76. A ground fault interrupter also is provided at the connector 74 to prevent an electrical shock hazard from occurring during the training exercise.

A conventional portable electric heater 51 is located on the floor 16 of the shed 12 and has an electrical cord 52 plugged into one of the duplex outlets 50. Such heaters are typically used in a gas cylinder storage shed located in a cold environment to heat the interior of the shed to a temperature at which the chemical in the upper section of the cylinders 36 and 38 will be in a gaseous state.

The contents of the shed 12 described thus far are typical of those found in industrial sheds which house cylinders of hazardous chemicals. However, several modifications have been made for training purposes.

In particular, leaks have been intentionally created in the cylinders. For example, the first cylinder 36 has a leak at the stem of output valve 42, while the second cylinder 38 has a small hole drilled through its wall at location 60. The first cylinder 36 also has been modified by including a quick-disconnect air hose fitting 62 attached in a hole in the cylinder wall. When the first cylinder 36 is within shed 12, a hose 64 connects this air hose fitting 62 to a similar fitting 66 through the left sidewall 20 of the shed. This latter fitting 66 is connected by a standard air pressure regulator 68 to an air hose connector 70 on the exterior of the shed. An external air hose 72 extends between the air hose connector 70 and an air compressor or other source of compressed air (not shown). Components 62–72 enable pressurized air to be introduced into the upper portion of the first cylinder 36 to create a hissing sound replicating escaping hazardous gas through the leaky outlet valve 42.

Modifications to the second cylinder 38 include a second quick-disconnect air hose fitting 80 located in an aperture in the upper portion of the cylinder and connected by hose 82 to a similar fitting 84 that extends through the right sidewall 19 of the shed 12. This latter fitting 84 is attached by a second air pressure regulator 86 to a connector 88 for another air hose 90 from the compressed air source. Components 80–90 enable pressurized air to be introduced into the second cylinder 38 to create a hissing sound replicating escaping hazardous gas through the hole at location 60.

A third quick-disconnect fitting 92 is located in another aperture through the lower portion of the second cylinder 38 and is connected by hose 94 to a fitting 96 that extends through an opening in the right sidewall 19 of the shed 12. Fitting 96 connects to a conventional fluid valve 97 which controls the flow of water from a hose 98 to the second cylinder 38. A water drain valve 99 is located at the bottom of the second cylinder 38.

During a training exercise, a chemical leak can be simulated in either cylinder 36 or 38. Usually only one leak at a time would be simulated. When the first gas cylinder 36 is selected, pressurized air is supplied through components 62–72 to produce a hissing sound at the site of the leak at the stem of outlet valve 42. Thus, the hissing air simulates a leak at that place in the first cylinder 36 which then can be treated by an emergency response trainee. The first regulator 68 can be adjusted to vary the pressure of air supplied to the first cylinder 36 and thus the degree of hissing at the simulated leak site. At the same time, the fog generator 14 is activated to introduce fog through duct coupling ring 26 in the right sidewall 19 of the shed 12 which simulates the hazy effect of escaping chlorine within the shed. Once the leak has been identified the trainee can attempt to tighten the valve 42 to close the leak or remove the first cylinder 36 from the shed for further emergency handling.

The second cylinder 38 can be used to simulate leaks in the wall of the hazardous material cylinder. Such simulation can be accomplished by introducing pressurized air through components 80–90 to produce a hissing sound at the location of 60 the hole. Water can also be introduced into the second cylinder 38 through components 92–98 thereby simulating a liquid leak through the hole at location 60 in the sidewall of the cylinder. The water and air may be introduced alone or in combination into the second cylinder. The air regulator 86 and the fluid valve 98 can be adjusted to control the amount of air and water, respectively, flowing into the second cylinder 38. While the leak is being simulated, fog from machine 40 is introduced into the shed 12 via coupling ring 26 connected to the first duct 28. Once the leak has been identified, the trainee can remove the first cylinder 36 from the shed for repair. Following the training exercise, the water in the second cylinder 38 can be drained via valve 99.

The foregoing description is directed primarily to preferred embodiments of the invention. Although some attention was given to various alternatives within the scope of the invention, it is anticipated that skilled artisans will likely realize additional alternatives that are now apparent from the disclosure of those embodiments. Accordingly, the scope of the invention should be determined from the following claims and not limited by the above disclosure.

I claim:

1. An simulator for training emergency response personnel in treating hazardous materials leaks, the simulator comprising:

a portable housing having a door;

a container of a type used to contain a hazardous material and located inside the housing, wherein the container has an outlet and has an intentionally present leak hole through which contents of the container escape into the housing during a training exercise, and further including a first fitting through which a fluid can be introduced into the container; and a first conduit connected to the first and extending exterior of said housing fitting to supply the fluid thereto.

2. The simulator as recited in claim 1 further comprising a second conduit having one end attached to the outlet of the container and another end coupled to the housing.

3. The simulator as recited in claim 1 wherein the first conduit comprises a first connector attached to the housing; and a hose connected between the first connector and the first fitting of the container.

4. The simulator as recited in claim 1 further comprising a pressure regulator attached to the first conduit.

5. The simulator as recited in claim 1 further comprising:

a second fitting attached to the container through which water can be introduced into the container; and a third conduit connected to the second fitting to supply water thereto.

6. The simulator as recited in claim 5 wherein the third conduit comprises a second connector attached to the housing; and another hose connected between the second connector and the second fitting of the container.

7. The simulator as recited in claim 5 further comprising a valve connected to the third conduit.

8. The simulator as recited in claim 1 further comprising a fog generating apparatus connected to the housing to introduce fog therein.

9. The simulator as recited in claim 1 further comprising a fog generator having an output; a chest for containing a frozen substance to cool generated fog, and having a first opening connected to the output of the fog generator and a second opening connected to the interior of the housing.

10. The simulator as recited in claim 1 wherein the housing further comprises a top with a window therein.

11. The simulator as recited in claim 1 further comprising an electric switch attached to the housing; and an electrical load inside the housing and connected to the electrical switch.

12. The simulator as recited in claim 1 wherein the housing is a shed.

13. A simulator for training emergency response personnel in treating hazardous materials leaks, the simulator comprising:

a housing having a door;

a first container of a type used to contain a hazardous material, wherein the first container is located in the housing and includes a first outlet and an intentionally present leak hole through which contents of the first container escape into the housing during a training exercise, and further including a first fitting through which a fluid can be introduced into the first container;

a second container of a type which is used to contain a hazardous material, wherein the second container is located inside the housing and has an outlet and an intentionally present leak hole through which contents of the second container escape into the housing during a training exercise, further including a second fitting through which air can be introduced into the second container and a third fitting through which water can be introduced into the second container;

a first conduit having one end attached to the outlet of the first container and another end coupled to the housing;

a second conduit connected to the first fitting to supply the fluid thereto;

a third first conduit having one end attached to the outlet of the second container and another end coupled to the housing;

a fourth conduit connected to the second fitting to supply air thereto;

a fifth conduit connected to the third fitting to supply water thereto.

14. The simulator as recited in claim 13 wherein each of the second and fourth conduits comprises a connector attached to the housing; a hose connected between the connector and the first fitting of the container; and an air pressure regulator attached to the connector.

15. The simulator as recited in claim 13 wherein the fifth conduit comprises a connector attached to the housing; a hose connected between the connector and the first fitting of the container; and a valve outside the housing and attached to the connector.

16. The simulator as recited in claim 13 further comprising a fog generating apparatus connected to the housing to introduce fog therein.

17. The simulator as recited in claim 13 further comprising a fog generator having an output; a chest for containing a frozen substance to cool generated fog, and having a first opening connected to the output of the fog generator and a second opening connected to the interior of the housing.

18. The simulator as recited in claim 13 wherein the housing further comprises a top with a window therein.

19. The simulator as recited in claim 13 further comprising an electric switch attached to the housing; and a heater inside the housing and connected to the electrical switch.

20. The simulator as recited in claim 13 further comprising an electric switch attached to the housing; and a light inside the housing and connected to the electrical switch.

21. The simulator as recited in claimer 13 further comprising a fastening mechanism for releasably securing the first and second containers to the housing.

22. The simulator as recited in claim 13 wherein the housing is a shed.

* * * * *